United States Patent [19]
Asghar et al.

[11] Patent Number: 6,085,314
[45] Date of Patent: *Jul. 4, 2000

[54] CENTRAL PROCESSING UNIT INCLUDING APX AND DSP CORES AND INCLUDING SELECTABLE APX AND DSP EXECUTION MODES

[75] Inventors: Saf Asghar, Austin, Tex.; Andrew Mills, Coto-de-Caza, Calif.

[73] Assignee: Advnced Micro Devices, Inc., Sunnyvale, Calif.

[*] Notice: This patent is subject to a terminal disclaimer.

[21] Appl. No.: 08/969,858

[22] Filed: Nov. 14, 1997

Related U.S. Application Data

[63] Continuation-in-part of application No. 08/618,243, Mar. 18, 1996, Pat. No. 5,794,068.
[51] Int. Cl.[7] .............................. G06F 9/30; G06F 15/163
[52] U.S. Cl. ............................. 712/213; 712/23; 712/35; 712/207
[58] Field of Search ..................... 395/800.23, 800.35, 395/383, 387, 359, 800.75; 712/23, 35, 204, 206, 213, 207, 203, 208, 210, 211, 217, 230, 245

[56] References Cited

U.S. PATENT DOCUMENTS

| | | |
|---|---|---|
| 4,173,041 | 10/1979 | Dvorak et al. . |
| 5,355,485 | 10/1994 | Denio et al. . |
| 5,542,059 | 7/1996 | Blomgren . |
| 5,588,118 | 12/1996 | Mandava et al. . |
| 5,619,665 | 4/1997 | Emma . |
| 5,721,945 | 2/1998 | Mills et al. ..................... 395/800.35 |

(List continued on next page.)

FOREIGN PATENT DOCUMENTS

| | | |
|---|---|---|
| 0 071 028 | 2/1983 | European Pat. Off. . |
| 0 442 041 A2 | 8/1991 | European Pat. Off. . |
| 0 478 904 A2 | 4/1992 | European Pat. Off. . |
| 0465054 | 4/1996 | European Pat. Off. . |
| 3711651 A1 | 10/1988 | Germany . |
| 97/35252 | 9/1997 | WIPO . |

OTHER PUBLICATIONS

International Search Report for PCT/US 96/19586 dated Apr. 28, 1997.
Halfhill, T.R., "AMD K6 Takes on Intel P6," BYTE, vol. 21, No. 1, Jan. 1, 1996, pp. 67, 68, 70 & 72.
International Search Report for PCT/US 97/01067 mailed Jun. 2, 1997.
International Search Report for PCT/US 98/10175 dated Sep. 2, 1998.

*Primary Examiner*—Larry D. Donaghue
*Attorney, Agent, or Firm*—Conley, Rose & Tayon, P.C.; Jeffrey C. Hood; Eric A. Stephenson

[57] ABSTRACT

A CPU or microprocessor which includes a general purpose CPU component, such as an X86 core, and also includes a DSP core. In a first embodiment, the CPU receives general purpose instructions, such as X86 instructions, wherein certain X86 instruction sequences implement DSP functions. The CPU includes a processor mode register which is written with one or more processor mode bits to indicate whether an instruction sequence implements a DSP function. The CPU also includes an intelligent DSP function decoder or preprocessor which examines the processor mode bits and determines if a DSP function is being executed. If a DSP function is being implemented by an instruction sequence, the DSP function decoder converts or maps the opcodes to a DSP macro instruction that is provided to the DSP core. The DSP core executes one or more DSP instructions to implement the desired DSP function in response to the macro instruction. If the processor mode bits indicate that X86 instructions in the instruction memory do not implement a DSP-type function, the opcodes are provided to the X86 core as which occurs in current prior art computer systems. In a second embodiment, the CPU receives sequences of instructions comprising X86 instructions and DSP instructions. The processor mode register is written with one or more processor mode bits to indicate whether an instruction sequence comprises X86 or DSP instructions, and the instructions are routed to the X86 core or to the DSP core accordingly.

20 Claims, 11 Drawing Sheets

U.S. PATENT DOCUMENTS

| | | | |
|---|---|---|---|
| 5,740,420 | 4/1998 | Palaniswami | 395/595 |
| 5,768,553 | 6/1998 | Tran | 395/384 |
| 5,781,750 | 7/1998 | Blomgren et al. | 395/385 |
| 5,781,792 | 7/1998 | Asghar et al. | 395/800.35 |
| 5,784,640 | 7/1998 | Asghar et al. | 395/800.35 |
| 5,790,824 | 8/1998 | Asghar et al. | 395/385 |
| 5,794,068 | 8/1998 | Asghar et al. | 395/800.35 |
| 5,829,031 | 10/1998 | Lynch | 711/137 |
| 5,854,913 | 12/1998 | Goetz et al. | 395/386 |

CENTRAL PROCESSING UNIT INCLUDING APX AND DSP CORES AND INCLUDING SELECTABLE APX AND DSP EXECUTION MODES

CONTINUATION DATA

This is a continuation-in-part of application Ser. No. 08/618,243 titled "Central Processing Unit Having an X86 and DSP Core and Including a DSP Function Decoder which Maps X86 Instructions to DSP Instructions" and filed Mar. 18, 1996, and which is assigned to Advanced Micro Devices Corp now U.S. Pat. No. 5,794,068.

CROSS REFERENCE TO RELATED APPLICATIONS

The following applications are related to the present application and are hereby incorporated by reference in their entirety.

U.S. patent application Ser. No. 08/618,243, titled "Central Processing Unit Having an X86 and DSP Core and Including a DSP Function Decoder which Maps X86 Instructions to DSP Instructions" and filed Mar. 18, 1996, now U.S. Pat. No. 5,794,068.

U.S. patent application Ser. No. 08/618,000, titled "Central Processing Unit Having X86 and DSP Functional Units" and filed Mar. 18, 1996, now U.S. Pat. No. 5,781,792.

U.S. patent application Ser. No. 08/618,242, titled "Central Processing Unit Including a DSP Function Preprocessor Having a Pattern Recognition Detector for Detecting Instruction Sequences which Perform DSP Functions" and filed Mar. 18, 1996, now U.S. Pat. No. 5,754,878.

U.S. patent application Ser. No. 08/618,241, titled "Central Processing Unit Including a DSP Function Preprocessor Having a Look-up Table Apparatus for Detecting Instruction Sequences which Perform DSP Functions" and filed Mar. 18, 1996, now U.S. Pat. No. 5,784,640.

U.S. patent application Ser. No. 08/618,240, titled "Central Processing Unit Including a DSP Function Preprocessor Which Scans Instruction Sequences for DSP Functions" and filed Mar. 18, 1996, now U.S. Pat. No. 5,790,824.

The above related applications are all assigned to Advanced Micro Devices, Inc.

FIELD OF THE INVENTION

The present invention relates to a computer system CPU or microprocessor which includes a general purpose core and a DSP core, wherein the CPU includes a switch for selecting a processor execution mode to selectively enable processing of DSP instructions.

DESCRIPTION OF THE RELATED ART

Personal computer systems and general purpose microprocessors were originally developed for business applications such as word processing and spreadsheets, among others. However, computer systems are currently being used to handle a number of real time DSP-related applications, including multimedia applications having video and audio components, video capture and playback, telephony applications, speech recognition and synthesis, and communication applications, among others. These real time or DSP-like applications typically require increased CPU floating point performance.

One problem that has arisen is that general purpose microprocessors originally designed for business applications are not well suited for the real-time requirements and mathematical computation requirements of modem DSP-related applications, such as multimedia applications and communications applications. For example, the X86 family of microprocessors from Intel Corporation are oriented toward integer-based calculations and memory management operations and do not perform DSP-type functions very well.

As personal computer systems have evolved toward more real-time and multimedia capable systems, the general purpose CPU has been correspondingly required to perform more mathematically intensive DSP-type functions. Therefore, many computer systems now include one or more digital signal processors which are dedicated towards these complex mathematical functions.

A recent trend in computer system architectures is the movement toward "native signal processing (NSP)". Native signal processing or NSP was originally introduced by Intel Corporation as a strategy to offload certain functions from DSPs and perform these functions within the main or general purpose CPU. The strategy presumes that, as performance and clock speeds of general purpose CPUs increase, the general purpose CPU is able to perform many of the functions formerly performed by dedicated DSPs. Thus, one trend in the microprocessor industry is an effort to provide CPU designs with higher speeds and augmented with DSP-type capabilities, such as more powerful floating point units. Another trend in the industry is for DSP manufacturers to provide DSPs that not only run at high speeds but also can emulate CPU-type capabilities such as memory management functions.

A digital signal processor is essentially a general purpose microprocessor which includes special hardware for executing mathematical functions at speeds and efficiencies not usually associated with microprocessors. In current computer system architectures, DSPs are used as co-processors and operate in conjunction with general purpose CPUs within the system. For example, current computer systems may include a general purpose CPU as the main CPU and include one or more multimedia or communication expansion cards which include dedicated DSPs. The CPU offloads mathematical functions to the digital signal processor, thus increasing system efficiency.

Digital signal processors include execution units that comprise one or more arithmetic logic units (ALUs) coupled to hardware multipliers which implement complex mathematical algorithms in a pipelined manner. The instruction set primarily comprises DSP-type instructions and also includes a small number of instructions having non-DSP functionality.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily Boolean/decision operations (or general data processing).

A general purpose CPU is comprised of an execution unit, a memory management unit, and a floating point unit, as well as other logic. The task of a general purpose CPU is to execute code and perform operations on data in the computer memory and thus to manage the computing platform. In general, the general purpose CPU architecture is designed primarily to perform Boolean/management/data manipulation decision operations. The instructions or opcodes executed by a general-purpose CPU include basic mathematical functions. However these mathematical functions are not well adapted to complex DSP-type mathematical operations. Thus a general purpose CPU is required to execute a large number of opcodes or instructions to perform basic DSP functions.

Therefore, a computer system and CPU architecture is desired which includes a general purpose CPU and which also performs DSP-type mathematical functions with increased performance. A CPU architecture is also desired which is backwards compatible with existing software applications which presume that the general purpose CPU is performing all of the mathematical computations. A new CPU architecture is further desired which provides increased mathematical performance for existing software applications.

One popular microprocessor used in personal computer systems is the X86 family of microprocessors. The X86 family of microprocessors includes the 8088, 8086, 80186, 80286, 80386, i486, Pentium, and P6 microprocessors from Intel Corporation. The X86 family of microprocessors also includes X86 compatible processors such as the 4486 and K5 processors from Advanced Micro Devices, the M1 processor from Cyrix Corporation, and the NextGen 5x86 and 6x86 processors from NextGen Corporation. The X86 family of microprocessors was primarily designed and developed for business applications. In general, the instruction set of the X86 family of microprocessors does not include sufficient mathematical or DSP functionality for modem multimedia and communications applications. Therefore, a new X86 CPU architecture is further desired which implements DSP functions more efficiently than current X86 processors. It would further be desirable that this new X86 CPU architecture did not require additional opcodes for the X86 processor.

SUMMARY OF THE INVENTION

The present invention comprises a CPU or microprocessor which includes a general purpose CPU component, such as an X86 core, and also includes a DSP core. The CPU includes a switch for selecting a processor execution mode. The switch selectively enables processing of general purpose instructions, e.g., APX instructions, or DSP instructions. In the preferred embodiment comprising an APX-based CPU, the CPU includes one or more bits, referred to as processor mode bits, that are set to indicate whether the instruction decode engine should interpret the incoming code sequence as DSP instructions or APX instructions. Thus, for example, the processor mode bit is set to indicate a sequence of DSP instructions, and the processor mode bit is cleared to indicate that the program sequence reverts back to a normal APX mode of operation. The CPU may include other means for indicating or differentiating between APX and DSP instructions, as desired. The CPU includes a preprocessor which examines the processor mode bit and selectively provides instructions to either the X86 core or the DSP.

In a first embodiment, the CPU receives only APX instructions. In this first embodiment, the CPU includes an intelligent DSP function decoder or preprocessor which examines sequences of APX instructions or opcodes (X86 opcodes) and converts or maps the instruction sequence to a DSP macro instruction or function identifier that is provided to the DSP core. The processor mode bit is set to indicate the start of an APX code sequence which implements a DSP function. The preprocessor thus examines the processor mode bit to determine if a DSP function is being executed. If the preprocessor determines that a DSP function is being executed based on the processor mode bit, the preprocessor converts or maps the instruction sequence to a DSP macro instruction or function identifier that is provided to the DSP core. The DSP core executes one or more DSP instructions to implement the desired DSP function indicated by the DSP macro or function identifier. The DSP core preferably performs the DSP function in parallel with other operations performed by the general purpose CPU core for increased system performance.

In one embodiment, the CPU includes a processor mode register which stores the processor mode bit, and also includes one or more bits, preferably a plurality of bits, which identify the type of DSP function implemented by the instruction sequence. Thus, the preprocessor examines the processor mode bit to determine if the APX code sequence implements a DSP function. If so, the preprocessor examines the plurality of bits to determine the general type of DSP function being implemented. The preprocessor uses the information on the general type of DSP function in creating the function identifier, and the preprocessor also examines the instruction sequence to extract values and parameters necessary for the DSP core to implement the DSP function.

In a second embodiment, the CPU receives an instruction sequence which comprises sequences of general purpose, e.g., APX instructions, and which also comprises sequences of DSP instructions. The respective processor mode bit is set to indicate the beginning of a sequence of DSP instructions, and the processor mode bit is cleared to indicate the beginning of a sequence of APX instructions. The CPU thus routes the instructions to the APX core or the DSP core based on the status of the processor mode bit.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

*Pentium System Architecture* by Don Anderson and Tom Shanley and available from Mindshare Press, 2202 Buttercup Dr., Richardson, Tex. 75082 (214) 231–2216, is hereby incorporated by reference in its entirety.

*Digital Signal Processing Applications Using the ADSP-2100 Family* Volumes 1 and 2, 1995 edition, available from Analog Devices Corporation of Norwood Mass., is hereby incorporated by reference in its entirety.

The Intel CPU Handbook, 1994 and 1995 editions, available from Intel Corporation, are hereby incorporated by reference in their entirety.

The AMD K5 Handbook, 1995 edition, available from Advanced Micro Devices Corporation, is hereby incorporated by reference in its entirety.

Computer System Block Diagram

Figure 1:
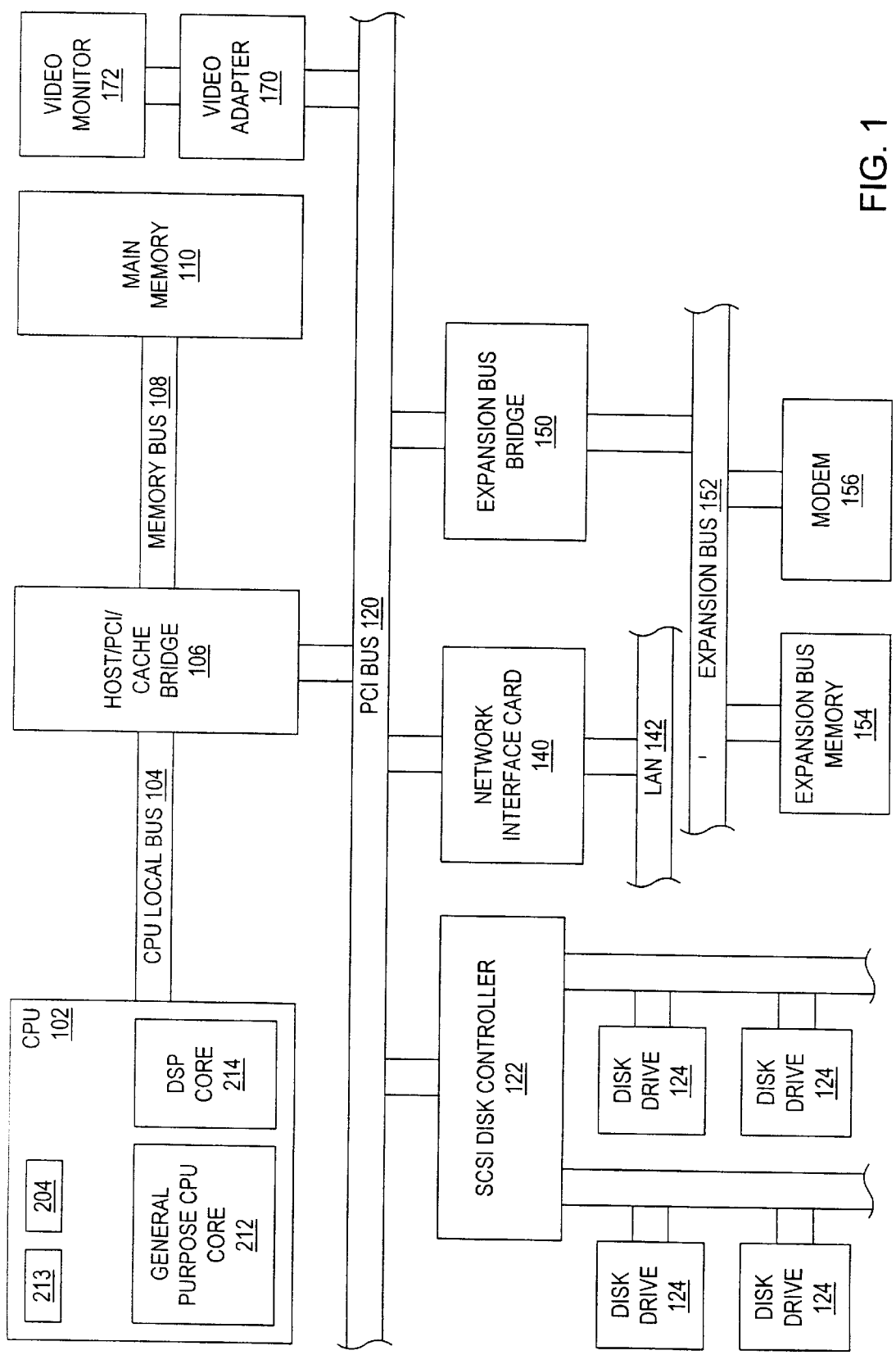
FIG. 1 is a block diagram of a computer system including a CPU having a general purpose CPU core and a DSP core according to the present invention

Referring now to FIG. 1, a block diagram of a computer system incorporating a central processing unit (CPU) or microprocessor 102 according to the present invention is shown. The computer system shown in FIG. 1 is illustrative only, and the CPU 102 of the present invention may be incorporated into any of various types of computer systems.

As shown, the CPU 102 includes a general purpose CPU core 212 and a DSP core 214. The general purpose core 212 executes general purpose (non-DSP) opcodes and the DSP core 214 executes DSP-type functions, as described further below. In the preferred embodiment, the general purpose CPU core 212 is an X86 core, i.e., is compatible with the X86 family of microprocessors. However, the general purpose CPU core 212 may be any of various types of CPUs, including the PowerPC family, the DEC Alpha, and the SunSparc family of processors, among others. In the following disclosure, the general purpose CPU core 212 is referred to as an X86 core for convenience. The general purpose core 212 may comprise one or more general purpose execution units, and the DSP core 214 may comprise one or more digital signal processing execution units.

As discussed further below, the CPU includes a switch 213 for selecting a processor execution mode. The switch 213 selectively enables processing of general purpose instructions, e.g., APX instructions, or DSP instructions. In the preferred embodiment comprising an APX-based CPU, the CPU includes one or more bits in a register, referred to as processor mode bits, that are set to indicate whether the instruction decode engine should interpret the incoming code sequence as DSP instructions or APX instructions. Thus, for example, the processor mode bit is set to indicate a sequence of DSP instructions, and the processor mode bit is cleared to indicate that the program sequence reverts back to a normal APX mode of operation. The CPU 102 may include other means for indicating or differentiating between APX and DSP instructions, as desired.

The CPU 102 also includes a preprocessor 204 which examines the processor mode bit and selectively provides instructions to either the X86 core 212 or the DSP 214.

As shown, the CPU 102 is coupled through a CPU local bus 104 to a host/PCI/cache bridge or chipset 106. The chipset 106 is preferably similar to the Triton chipset available from Intel Corporation. A second level or L2 cache memory (not shown) may be coupled to a cache controller in the chipset, as desired. Also, for some processors the external cache may be an L1 or first level cache. The bridge or chipset 106 couples through a memory bus 108 to main memory 110. The main memory 110 is preferably DRAM (dynamic random access memory) or EDO (extended data out) memory, or other types of memory, as desired.

The chipset 106 includes various peripherals, including an interrupt system, a real time clock (RTC) and timers, a direct memory access (DMA) system, ROM/Flash memory, communications ports, diagnostics ports, command/status registers, and non-volatile static random access memory (NVSRAM) (all not shown).

The host/PCI/cache bridge or chipset 106 interfaces to a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120. In the embodiment shown in FIG. 1, a video/graphics controller or adapter 170 and a network interface controller 140 are coupled to the PCI bus 120. The video adapter connects to a video monitor 172, and the network interface controller 140 couples to a local area network (LAN). A SCSI (small computer systems interface) adapter 122 may also be coupled to the PCI bus 120, as shown. The SCSI adapter 122 may couple to various SCSI devices 124, such as a CD-ROM drive and a tape drive, as desired. Various other devices may be connected to the PCI bus 120, as is well known in the art.

Expansion bus bridge logic 150 may also be coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the MicroChannel architecture (MCA) bus. Various devices may be coupled to the expansion bus 152, such as expansion bus memory 154 and a modem 156.

CPU Block Diagram

Figure 2:
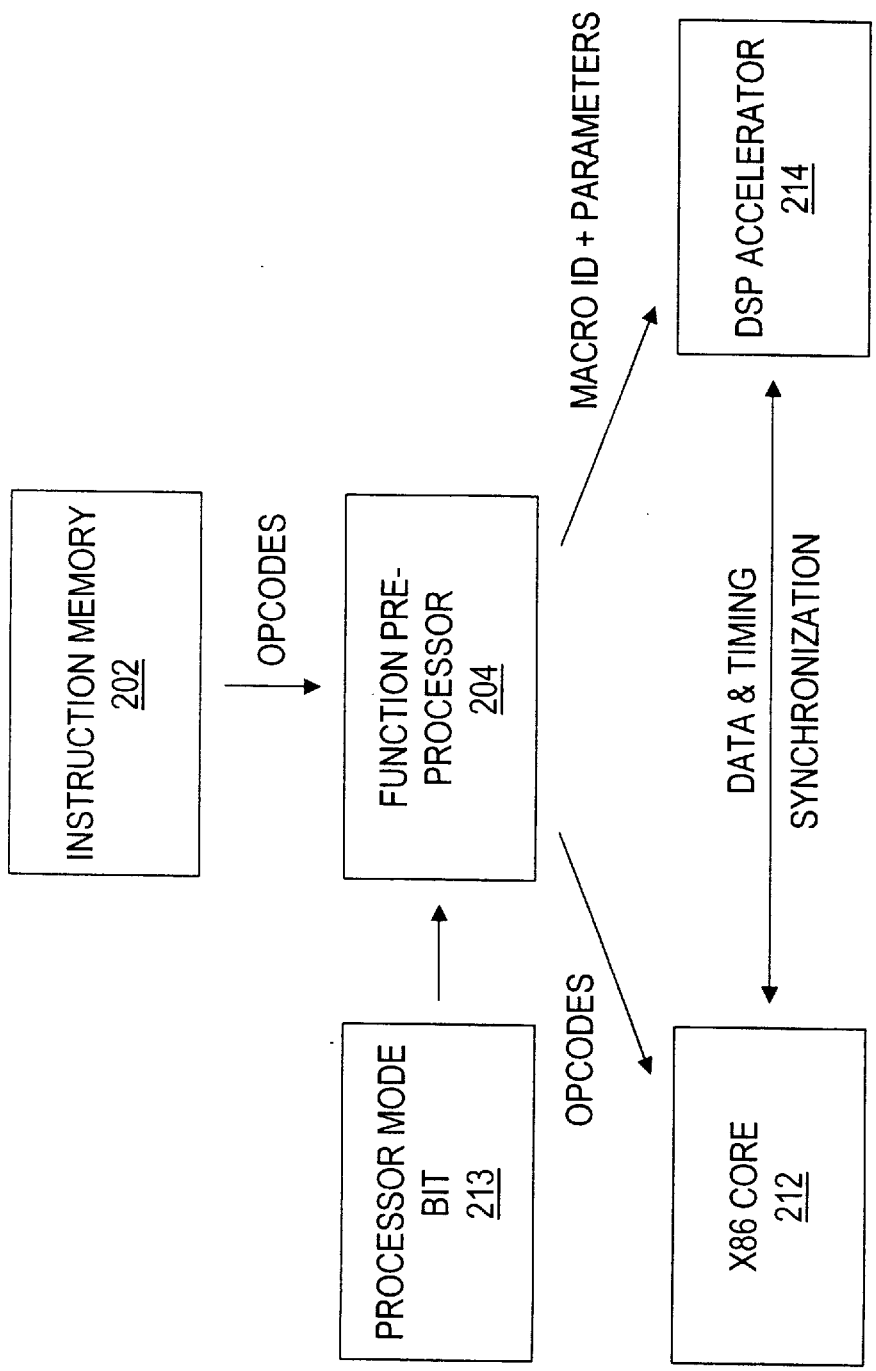
FIG. 2 is a block diagram of the CPU of FIG. 1 including a general purpose CPU core and a DSP core and including a DSP function preprocessor according to the present invention.

Referring now to FIG. 2, a high level block diagram illustrating certain components in the CPU 102 of FIG. 1 is shown. As shown, the CPU 102 includes an instruction cache or instruction memory 202 which receives instructions or opcodes from the system memory 110. Function preprocessor 204 is coupled to the instruction memory 202 and examines instruction sequences or opcode sequences in the instruction memory 202. The function preprocessor 204 is also coupled to the X86 core 212 and the DSP core 214. The function preprocessor 204 is further coupled to the processor mode register 213 storing the processor mode bit. As shown, the function preprocessor 204 examines the processor mode bit and selectively provides instructions or opcodes to either the X86 core 212 or selectively provides op-codes or information to the DSP core 214.

The X86 core 212 and DSP core 214 are coupled together and provide data and timing signals between each other. In one embodiment, the CPU 102 includes one or more buffers (not shown) which interface between the X86 core 212 and the DSP core 214 to facilitate transmission of data between the X86 core 212 and the DSP core 214.

In a first embodiment, the CPU 102 receives only APX instructions. In this first embodiment, if the processor mode bit is set to indicate DSP functions, the function preprocessor 204 examines the sequences of APX instructions or opcodes (X86 opcodes) and converts or maps the instruction sequence to a DSP macro instruction or function identifier that is provided to the DSP core. The processor mode bit is thus set to indicate the start of an APX code sequence which implements a DSP function. The function preprocessor 204 examines the processor mode bit to determine if a DSP function is being executed by the APX code sequence. If the function preprocessor 204 determines that a DSP function is being executed based on the processor mode bit, the function preprocessor 204 converts or maps the instruction sequence to a DSP macro instruction or function identifier that is provided to the DSP core 214. The DSP core 214 executes one or more DSP instructions to implement the desired DSP function indicated by the DSP macro or function identifier. The DSP core 214 preferably performs the DSP function in parallel with other operations performed by the general purpose CPU core 212 for increased system performance.

In one embodiment, the processor mode register 213 stores the processor mode bit, and also includes one or more bits, preferably a plurality of bits, which identify the type of DSP function implemented by the instruction sequence. Thus, the preprocessor 204 examines the processor mode bit to determine if the APX code sequence implements a DSP function. If so, the preprocessor 204 examines the plurality of bits to determine the general type of DSP function being implemented. The preprocessor 204 uses the information on the general type of DSP function in creating the function identifier, and the preprocessor 204 also examines the instruction sequence to extract values and parameters necessary for the DSP core to implement the DSP function.

In a second embodiment, the CPU 212 receives an instruction sequence which comprises sequences of general purpose, e.g., APX instructions, and which also comprises sequences of DSP instructions. The respective processor mode bit is set to indicate the beginning of a sequence of DSP instructions, and the processor mode bit is cleared to indicate the beginning of a sequence of APX instructions. The pre-processor 204 thus routes the instructions to the APX core or the DSP core based on the status of the processor mode bit. In this embodiment, the pre-processor 204 is not required to map APX instructions into DSP macros, but rather simply routes APX instructions to the x 86 core 212 and routes DSP instructions to the DSP core 214 based on the status of the processor mode bit.

FIG. 3—Flowchart

Figure 3:
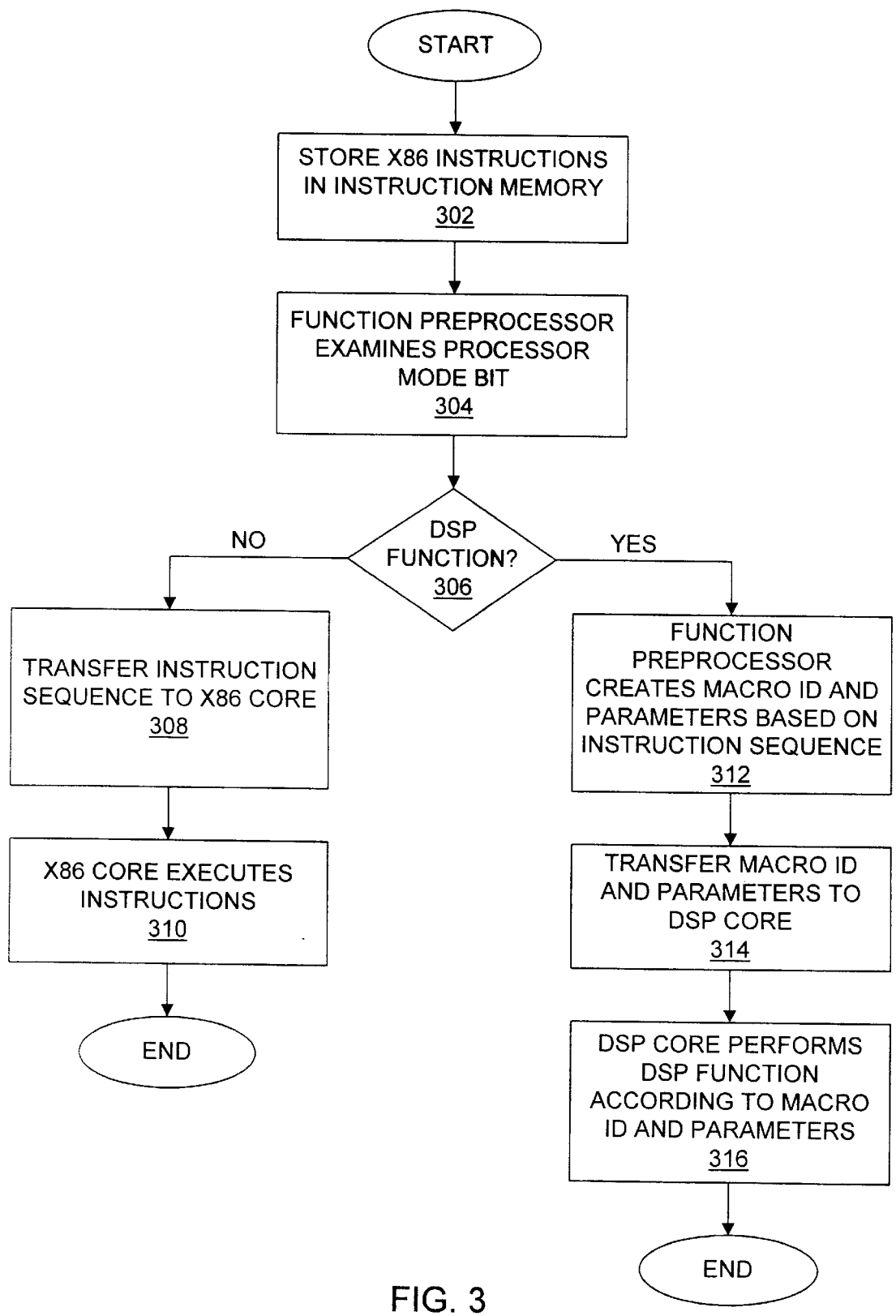
FIG. 3 is a flowchart diagram illustrating operation of the present invention.

Referring now to FIG. 3, a flowchart diagram illustrating operation of the first embodiment of the present invention is shown. It is noted that two or more of the steps in FIG. 3 may operate concurrently, and the operation of the invention is shown in flowchart form for convenience.

As shown, in step 302 the instruction memory 202 receives and stores a plurality of X86 instructions. The plurality of X86 instructions may include one or more instruction sequences which implement a DSP function.

In step 304 the function preprocessor 204 analyzes the processor mode bit. The value of the processor mode bit is preferably set by the program, i.e., the program which comprises the instruction sequences being examined. As noted above, in the first embodiment, the processor mode bit is set to indicate that the sequence of instructions are designed or intended to perform a DSP-type function. The processor mode bit is cleared to indicate that the sequence of instructions are a regular sequence of X86 instructions that are not intended to perform a DSP-type function. In the present disclosure, a DSP-type function comprises one or more of the following mathematical functions: correlation, convolution, Fast Fourier Transform, finite impulse response filter, infinite impulse response filter, inner product, and matrix manipulation, among others.

In step 306 the function preprocessor 204 determines, based on the status of the processor mode bit, if the sequence of instructions are designed or intended to perform a DSP-type function.

If the processor mode bit is cleared to indicate that the instructions or opcodes stored in the instruction cache 202 do not correspond to a DSP-type function, the instructions are provided to the X86 core 212 in step 308. Thus, these instructions or opcodes are provided directly from the instruction cache 202 to the X86 core 212 for execution, as occurs in prior art X86 compatible CPUs. After the opcodes are transferred to the X86 core 212, in step 310 the X86 core 212 executes the instructions.

If the processor mode bit is set to indicate that the sequence of instructions correspond to or implement a DSP-type function in step 306, then in step 312 the function preprocessor 204 analyzes the sequence of instructions and determines the respective DSP-type function being implemented. In step 312 the function preprocessor 204 maps the sequence of instructions to a respective DSP macro identifier, also referred to as a function identifier. The function preprocessor 204 also analyzes the information in the sequence of opcodes in step 312 and generates zero or more parameters for use by the DSP core or accelerator 214 in executing the function identifier.

As described above, in one embodiment of the invention, the processor mode register 213 stores a processor mode bit and in addition stores one or more bits, preferably a plurality of bits, which indicate the general type of DSP function being performed. Thus the application program writes a value into the processor mode register indicating the type of DSP function being implemented by the APX instruction sequence. In this embodiment, in step 312 the preprocessor 204 uses the value indicating the type of DSP function to aid in converting the sequence of instructions into a DSP function identifier and zero or more parameters. Thus, in this embodiment, the preprocessor 204 examines the processor mode bit in step 304 to determine if the APX code sequence implements a DSP function. If so, in step 312 the preprocessor 204 examines the plurality of bits to determine the general type of DSP function being implemented. The preprocessor 204 then examines the instruction sequence in step 312 to extract values and parameters necessary for the DSP core to implement the DSP function.

As shown, after the preprocessor 204 has generated the function identifier and the parameters in step 312, in step 314 the function preprocessor 204 provides the function identifier and the parameters to the DSP core 214.

The DSP core 214 receives the function identifier and the associated parameters from the function preprocessor 204 and in step 316 performs the respective DSP function. In the preferred embodiment, the DSP core 214 uses the function identifier to index into a DSP microcode RAM or ROM to execute a sequence of DSP instructions or opcodes. The DSP instructions cause the DSP to perform the desired DSP-type function. The DSP core 214 also uses the respective parameters in executing the DSP function.

As mentioned above, the X86 core 212 and DSP core 214 are coupled together and provide data and timing signals between each other. In the preferred embodiment, the X86 core 212 and DSP core 214 operate substantially in parallel. Thus, while the X86 core 212 is executing one sequence of opcodes, the DSP accelerator 214 may be executing one or more DSP functions corresponding to another sequence of opcodes. Thus, the DSP core 214 does not operate as a slave or co-processor, but rather operates as an independent execution unit or pipeline. The DSP core 214 and the X86 core 212 provide data and timing signals to each other to indicate the status of operations and also to provide any data outputs produced, as well as to ensure data coherency/independence.

Example Operation

The following describes an example of how a string or sequence of X86 opcodes are converted into a function identifier and then executed by the DSP core or accelerator 214 according to the present invention. The following describes an X86 opcode sequence which performs a simple inner product computation, wherein the inner product is averaged over a vector comprising 20 values:

| | X86 Code (Simple inner product) | |
|---|---|---|
| 1 | Mov ECX, num_samples; | {Set up parameters for macro} |
| 1 | Mov ESI, address_1 | |
| 1 | Mov EDI, address_2 | |
| 1 | Mov EAX, 0; | {Initialize vector indices} |
| 1 | Mov EBX, 0; | |
| 4 | FLdZ; | {Initialize sum of products} |
| | Again: | |
| | | {Update counter} |
| 4 | Fld dword ptr [ESI+EAX*4]; | {Get vector elements and} |
| 1 | Inc EAX; | {update indices} |
| 4 | Fld dword ptr [EDI+EBX*4]; | |
| 1 | Inc EBX; | |
| 13 | FMulP St(1), St; | {Compute product term} |
| 7 | FAddP St(1), St; | {Add term to sum} |
| 1 | LOOP Again; | {Continue if more terms} |

As shown, the X86 opcode instructions for a simple inner product comprise a plurality of move instructions followed by an F-load function wherein this sequence is repeated a plurality of times. If this X86 opcode sequence were executed by the X86 core 212, the execution time for this inner product computation would require 709 cycles (9+20× 35). This assumes i486 timing, concurrent execution of floating point operations, and cache hits for all instructions and data required for the inner product computation. The function preprocessor 204 analyzes the sequence of opcodes and detects that the opcodes are performing an inner product computation. The function preprocessor 204 then converts this entire sequence of X86 opcodes into a single macro or function identifier and one or more parameters. An example macro or function identifier that is created based on the X86 opcode sequence shown above would be as follows:

| Example Macro (as it appears in assembler) | |
|---|---|
| Inner_product_simple ( | |
| address_1, | {Data vector} |
| address_2, | {Data vector} |
| num_samples); | {Length of vector} |

This function identifier and one or more parameters are provided to the DSP core 214. The DSP core 214 uses the macro provided from the function preprocessor 204 to load one or more DSP opcodes or instructions which execute the DSP function. In the preferred embodiment, the DSP core 214 uses the macro to index into a ROM which contains the instructions used for executing the DSP function. In this example, the DSP code or instructions executed by the DSP core 214 in response to receiving the macro described above are shown below:

| | DSP Code (Simple inner product) | |
|---|---|---|
| 1 | Cntr =num_samples; | {Set up parameters from macro} |
| 1 | ptr1 =address_1; | |
| 1 | ptr2 =address_2; | |
| 1 | MAC =0; | {Initialize sum of products} |
| 1 | reg1 =*ptr1++, | {Pre-load multiplier input registers} |
| | reg2 =*ptr2++; | |
| 1 | Do LOOP until ce; | {Specify loop parameters} |
| 1 | MAC +=reg1 *reg2, | {Form sum of products} |
| | reg1 =*ptr1++, | |
| | reg2 =*ptr2++; | |
| | LOOP: | {Continue if more terms} |

In this example, the DSP core 214 performs this inner product averaged over a vector comprising 20 values and consumes a total of 26 cycles (6+20×1). This assumes typical DSP timing, including a single cycle operation of instructions, zero overhead looping and cache hits for all instructions and data. Thus, the DSP core 214 provides a performance increase of over 28 times of that where the X86 core 212 executes this DSP function.

Figure 4:
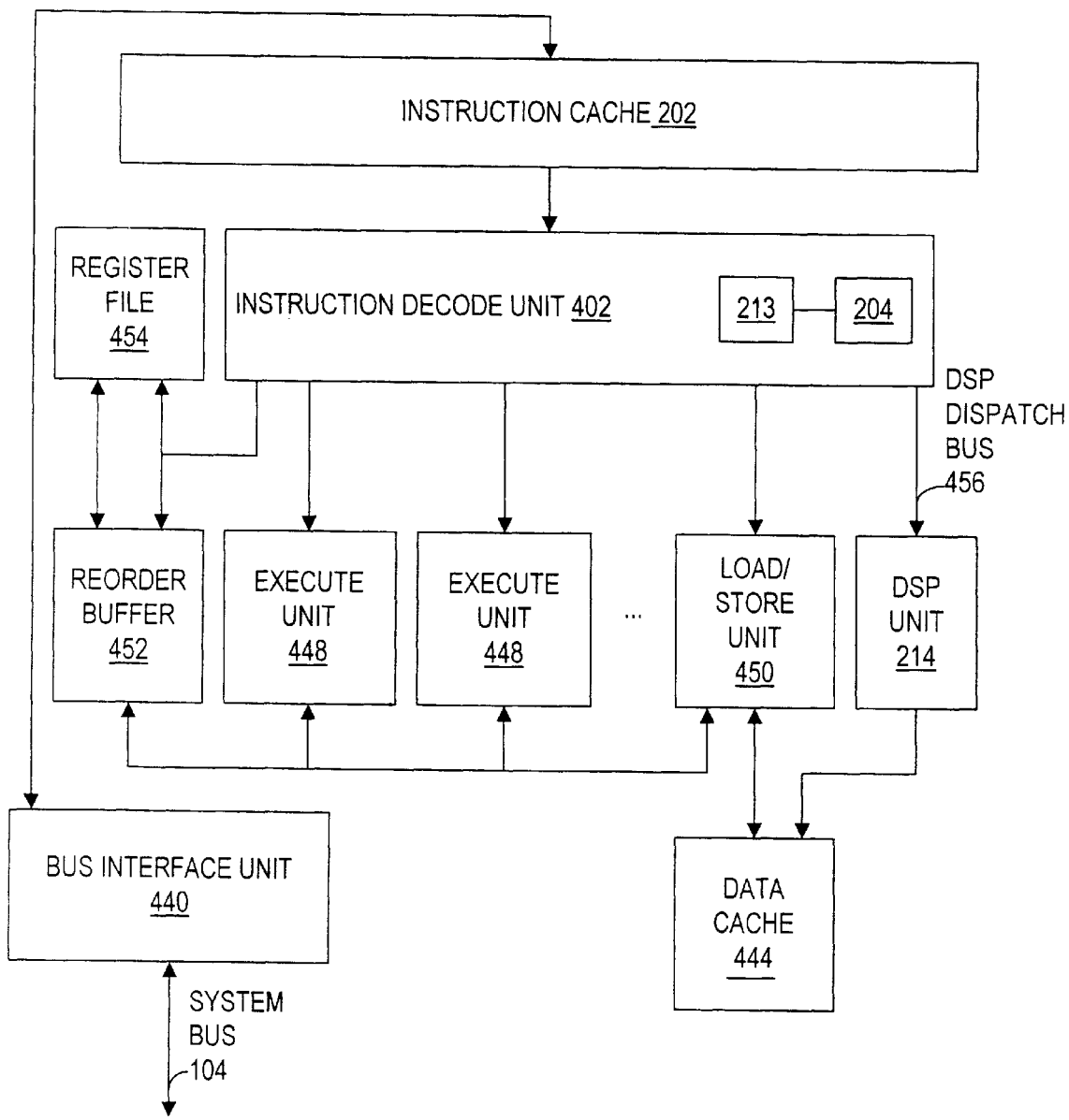
FIG. 4 is a more detailed block diagram of the CPU of FIG. 1.

FIG. 4—CPU Block Diagram

Referring now to FIG. 4, a more detailed block diagram is shown illustrating the internal components of the CPU 102 according to the present invention. Elements in the CPU 102 that are not necessary for an understanding of the present invention are not described for simplicity. As shown, in the preferred embodiment the CPU 102 includes a bus interface unit 440, instruction cache 202, a data cache 444, an instruction decode unit 402, a plurality of execute units 448, a load/store unit 450, a reorder buffer 452, a register file 454, and a DSP unit 214.

As shown, the CPU 102 includes a bus interface unit 440 which includes circuitry for performing communication upon CPU bus 104. The bus interface unit 440 interfaces to the data cache 444 and the instruction cache 202. The instruction cache 202 prefetches instructions from the system memory 110 and stores the instructions for use by the CPU 102. The instruction decode unit 402 is coupled to the instruction cache 202 and receives instructions from the instruction cache 202. The instruction decode unit 402 includes function preprocessor 204 and processor mode register or bit 213, as shown. The function preprocessor 204 in the instruction decode unit 402 is coupled to the instruction cache 202. The instruction decode unit 402 further includes an instruction alignment unit as well as other logic.

The instruction decode unit 402 couples to a plurality of execution units 448, reorder buffer 452, and load/store unit 450. The plurality of execute units are collectively referred to herein as execute units 448. Reorder buffer 452, execute units 448, and load/store unit 450 are each coupled to a forwarding bus 458 for forwarding of execution results. Load/store unit 450 is coupled to data cache 444. DSP unit 214 is coupled directly to the instruction decode unit 402 through the DSP dispatch bus 456. It is noted that one or more DSP units 214 may be coupled to the instruction decode unit 402.

Bus interface unit 440 is configured to effect communication between microprocessor 102 and devices coupled to system bus 104. For example, instruction fetches which miss instruction cache 202 are transferred from main memory 110 by bus interface unit 440. Similarly, data requests performed by load/store unit 450 which miss data cache 444 are transferred from main memory 110 by bus interface unit 440. Additionally, data cache 444 may discard a cache line of data which has been modified by microprocessor 102. Bus interface unit 440 transfers the modified line to main memory 110.

Instruction cache 202 is preferably a high speed cache memory for storing instructions. It is noted that instruction cache 202 may be configured into a set-associative or direct mapped configuration. Instruction cache 202 may additionally include a branch prediction mechanism for predicting branch instructions as either taken or not taken. A "taken" branch instruction causes instruction fetch and execution to continue at the target address of the branch instruction. A "not taken" branch instruction causes instruction fetch and execution to continue at the instruction subsequent to the branch instruction. Instructions are fetched from instruction cache 202 and conveyed to instruction decode unit 402 for decode and dispatch to an execution unit. The instruction cache 202 may also include a macro prediction mechanism for predicting macro instructions and taking the appropriate action.

Instruction decode unit 402 decodes instructions received from the instruction cache 202 and provides the decoded instructions to the execute units 448, the load/store unit 450, or the DSP unit 214. The instruction decode unit 402 is preferably configured to dispatch an instruction to more than one execute unit 448.

The instruction decode unit 402 includes function preprocessor 204. According to the first embodiment of the present invention, the function preprocessor 204 in the instruction decode unit 402 is configured to examine the status of the processor mode bit 213 to determine whether an X86 instruction sequence in the instruction cache 202 corresponds to or performs DSP functions. If the processor mode bit 213 is set to indicate such an instruction sequence, the function preprocessor 204 generates a corresponding macro and parameters and transmits the corresponding DSP macro and parameters to the DSP Unit 214 upon DSP dispatch bus 456. The DSP unit 214 receives the DSP function macro and parameter information from the instruction decode unit 402 and performs the indicated DSP function. Additionally, DSP unit 214 is preferably configured to access data cache 444 for data operands. Data operands may be stored in a memory within DSP unit 214 for quicker access, or may be accessed directly from data cache 444 when needed. Function preprocessor 204 provides feedback to instruction cache 202 to ensure that sufficient look ahead instructions are available for macro searching.

If the processor mode bit 213 indicates that the X86 instructions in the instruction cache 202 are not intended to perform a DSP function, the instruction decode unit 402 decodes the instructions fetched from instruction cache 202 and dispatches the instructions to execute units 448 and/or load/store unit 450. Instruction decode unit 402 also detects the register operands used by the instruction and requests these operands from reorder buffer 452 and register file 454. Execute units 448 execute the X86 instructions as is known in the art Also, if the DSP 214 is not included in the CPU 102 or is disabled through software, instruction decode unit 402 dispatches all X86 instructions to execute units 448. Execute units 448 execute the X86 instructions as in the prior art. In this manner, if the DSP unit 214 is disabled, the X86 code, including the instructions which perform DSP functions, are executed by the X86 core, as is currently done in prior art X86 microprocessors. Thus, if the DSP unit 214 is disabled, the program executes correctly even though operation is less efficient than the execution of a corresponding routine in the DSP 214. Advantageously, the enabling or disabling, or the presence or absence, of the DSP core 214 in the CPU 102 does not affect the correct operation of the program.

In one embodiment, execute units 448 are symmetrical execution units that are each configured to execute the instruction set employed by microprocessor 102. In another embodiment, execute units 448 are asymmetrical execution units configured to execute dissimilar instruction subsets. For example, execute units 448 may include a branch execute unit for executing branch instructions, one or more arithmetic/logic units for executing arithmetic and logical instructions, and one or more floating point units for executing floating point instructions. Instruction decode unit 402 dispatches an instruction to an execute unit 448 or load/store unit 450 which is configured to execute that instruction.

Load/store unit 450 provides an interface between execute units 448 and data cache 444. Load and store memory operations are performed by load/store unit 450 to data cache 444. Additionally, memory dependencies between load and store memory operations are detected and handled by load/store unit 450.

Execute units 448 and load/store unit(s) 450 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 402, execute units 448, and load/store unit 450. Such an embodiment may perform the dispatch function within the centralized reservation station.

CPU 102 preferably supports out of order execution and employs reorder buffer 452 for storing execution results of speculatively executed instructions and storing these results into register file 454 in program order, for performing dependency checking and register renaming, and for providing for mispredicted branch and exception recovery. When an instruction is decoded by instruction decode unit 402, requests for register operands are conveyed to reorder buffer 452 and register file 454. In response to the register operand requests, one of three values is transferred to the execute unit 448 and/or load/store unit 450 which receives the instruction: (1) the value stored in reorder buffer 452, if the value has been speculatively generated; (2) a tag identifying a location within reorder buffer 452 which will store the result, if the value has not been speculatively generated; or (3) the value stored in the register within register file 454, if no instructions within reorder buffer 452 modify the register. Additionally, a storage location within reorder buffer 452 is allocated for storing the results of the instruction being decoded by instruction decode unit 402. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 448 or load/store unit 450 execute an instruction, the tag assigned to the instruction by reorder buffer 452 is conveyed upon result bus 458 along with the result of the instruction. Reorder buffer 452 stores the result in the indicated storage location. Additionally, execute units 448 and load/store unit 450 compare the tags conveyed upon result bus 458 with tags of operands for instructions stored therein. If a match occurs, the unit captures the result from result bus 458 and stores it with the corresponding instruction. In this manner, an instruction may receive the operands it is intended to operate upon. Capturing results from result bus 458 for use by instructions is referred to as "result forwarding".

Instruction results are stored into register file 454 by reorder buffer 452 in program order. Storing the results of an instruction and deleting the instruction from reorder buffer 452 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 452 discards the instructions subsequent to the mispredicted branch instructions. Instructions thus discarded are also flushed from execute units 448, load/store unit 450, and instruction decode unit 402.

Register file 454 includes storage locations for each register defined by the microprocessor architecture employed by microprocessor 102. For example, in the preferred embodiment where the CPU 102 includes an x86 microprocessor architecture, the register file 454 includes locations for storing the EAX, EBX, ECX, EDX, ESI, EDI, ESP, and EBP register values.

Data cache 444 is a high speed cache memory configured to store data to be operated upon by microprocessor 102. It is noted that data cache 444 may be configured into a set-associative or direct-mapped configuration.

For more information regarding the design and operation of an X86 compatible microprocessor, please see co-pending patent application entitled "High Performance Superscalar Microprocessor", Ser. No. 08/146,382, filed Oct. 29, 1993 by Witt, et al, now U.S. Pat. No. 5,651,125, and co-pending patent application entitled "Superscalar Microprocessor Including a High Performance Instruction Alignment Unit", Ser. No. 08/377,843, filed Jan. 25, 1995 by Witt, et al now U.S. Pat. No. 5,819,057, which are both assigned to the assignee of the present application, and which are both hereby incorporated by reference in their entirety as though fully and completely set forth herein. Please also see "Superscalar Microprocessor Design" by Mike Johnson, Prentice-Hall, Englewood Cliffs, N.J., 1991, which is hereby incorporated herein by reference in its entirety.

Figure 5:
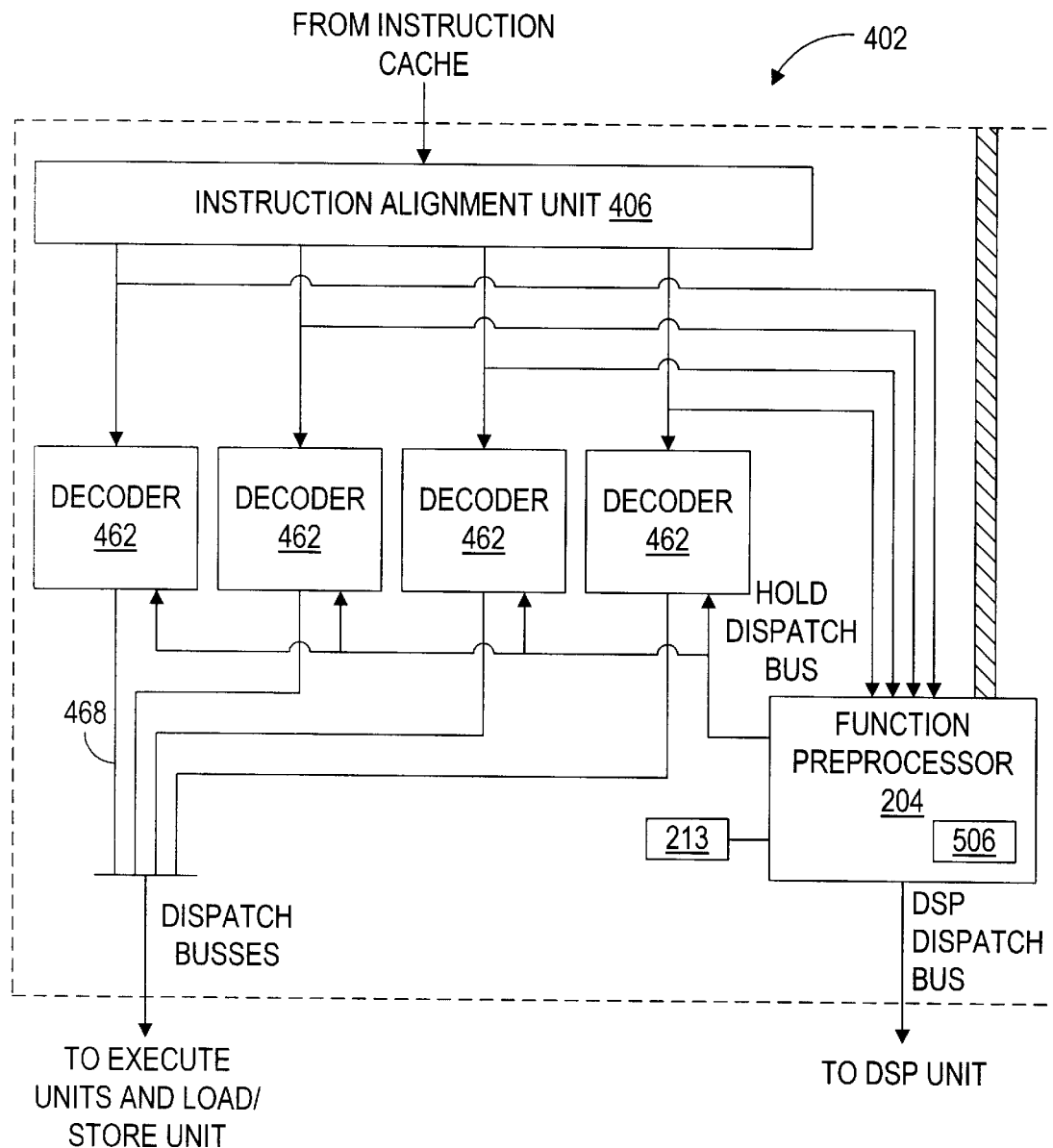
FIG. 5 is a block diagram of the Instruction Decode Unit of FIG. 4.

FIG. 5—Instruction Decode Unit

Referring now to FIG. 5, one embodiment of instruction decode unit 402 is shown. Instruction decode unit 402 includes an instruction alignment unit 460, a plurality of decoder circuits 462, processor mode register or bit 213, and a DSP function preprocessor 204. Instruction alignment unit 460 is coupled to receive instructions fetched from instruction cache 202 and aligns instructions to decoder circuits 462.

Instruction alignment unit 260 routes instructions to decoder circuits 462. In one embodiment, instruction alignment unit 260 includes a byte queue in which instruction bytes fetched from instruction cache 202 are queued. Instruction alignment unit 460 locates valid instructions from within the byte queue and dispatches the instructions to respective decoder circuits 462. In another embodiment, instruction cache 202 includes predecode circuitry which predecodes instruction bytes as they are stored into instruction cache 202. Start and end byte information indicative of the beginning and end of instructions is generated and stored within instruction cache 202. The predecode data is transferred to instruction alignment unit 460 along with the instructions, and instruction alignment unit 460 transfers instructions to the decoder circuits 462 according to the predecode information.

The function preprocessor 204 is also coupled to the instruction cache 202. As described above, the function preprocessor 204 examines the processor mode bit in order to detect instruction sequences in the instruction cache 202 which perform DSP instructions. Decoder circuits 462 and function preprocessor 204 receive X86 instructions from the instruction alignment unit 460. The function preprocessor 204 provides an instruction disable signal upon a DSP bus to each of the decoder units 462.

Each decoder circuit 462 decodes the instruction received from instruction alignment unit 460 to determine the register operands manipulated by the instruction as well as the unit to receive the instruction. An indication of the unit to receive the instruction as well as the instruction itself are conveyed upon a plurality of dispatch buses 468 to execute units 448 and load/store unit 450. Other buses, not shown, are used to request register operands from reorder buffer 452 and register file 454.

The function preprocessor 204 examines the processor mode bit to determine if streams or sequences of X86 instructions from the instruction cache 202 implement a DSP function. If so, the function preprocessor 204 maps the X86 instruction stream to a DSP macro and zero or more parameters and provides this information to one of the one or more DSP units 214. In one embodiment, when the respective instruction sequence reaches the decoder circuits 462, the function preprocessor 204 asserts a disable signal to each of the decoders 462 to disable operation of the decoders 462 for the detected instruction sequence. When a decoder circuit 462 detects the disable signal from function preprocessor 204, the decoder circuit 462 discontinues decoding operations until the disable signal is released. After the instruction sequence corresponding to the DSP function has exited the instruction cache 202, the processor mode bit is cleared, and the function preprocessor 204 removes the disable signal to each of the decoders 462. In other words, once the processor mode bit is cleared and the function preprocessor 204 detects the end of the X86 instruction sequence, the function preprocessor 204 removes the disable signal to each of the decoders 462, and the decoders resume operation.

Each of decoder circuits 462 is configured to convey an instruction upon one of dispatch buses 468, along with an indication of the unit or units to receive the instruction. In one embodiment, a bit is included within the indication for each of execute units 448 and load/store unit 450. If a particular bit is set, the corresponding unit is to execute the instruction. If a particular instruction is to be executed by more than one unit, more than one bit in the indication may be set.

Function Preprocessor

As shown in FIG. 5, in the first embodiment the function preprocessor 204 comprises a conversion/mapping circuit 506 for converting a sequence of instructions in the instruction memory 202 which implements a digital signal processing function into a digital signal processing function identifier or macro identifier and zero or more parameters. Thus if the processor mode bit indicates that the sequence of instructions in the instruction memory 202 implements a DSP function, the conversion/mapping circuit 506 converts this sequence of instructions into a DSP function identifier and zero or more parameters. For example, if the instruction sequence determination circuit 504 examines and determines that the sequence of instructions in the instruction memory 202 implements an FFT function, the conversion/mapping circuit 506 converts this sequence of instructions into a FFT function identifier and zero or more parameters.

As discussed above with respect to step 312 of FIG. 3, in one embodiment of the invention the processor mode register 213 stores a processor mode bit and in addition stores one or more bits, preferably a plurality of bits, which indicate the general type of DSP function being performed. Thus the application program writes a value into the processor mode register 213 indicating the type of DSP function being implemented by the APX instruction sequence. The conversion/mapping circuit 506 uses the value indicating the type of DSP function to aid in converting the sequence of instructions into a DSP function identifier and zero or more parameters.

Figure 6:
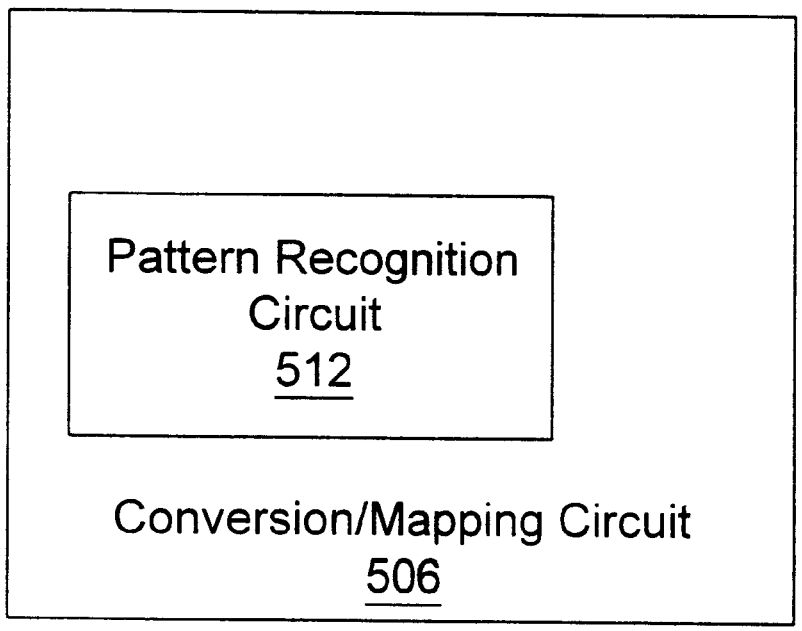
FIG. 6 is a block diagram of the function preprocessor including a pattern recognition detector according to one embodiment of the invention.

FIG. 6—Pattern Recognition Circuit

Referring now to FIG. 6, in one embodiment the function preprocessor 204 includes a pattern recognition circuit or pattern recognition detector 512 which determines whether a sequence of instructions in the instruction memory 202 implements a digital signal processing function. The pattern recognition circuit 512 is used to convert the sequence of instructions into a DSP function identifier and zero or more parameters.

The pattern recognition circuit 512 stores a plurality of patterns of instruction sequences which implement digital signal processing functions. The pattern recognition circuit 512 stores bit patterns which correspond to opcode sequences of machine language instructions which perform DSP functions, such as FFTs, inner products, matrix manipulation, correlation, convolution, etc.

Figure 7:
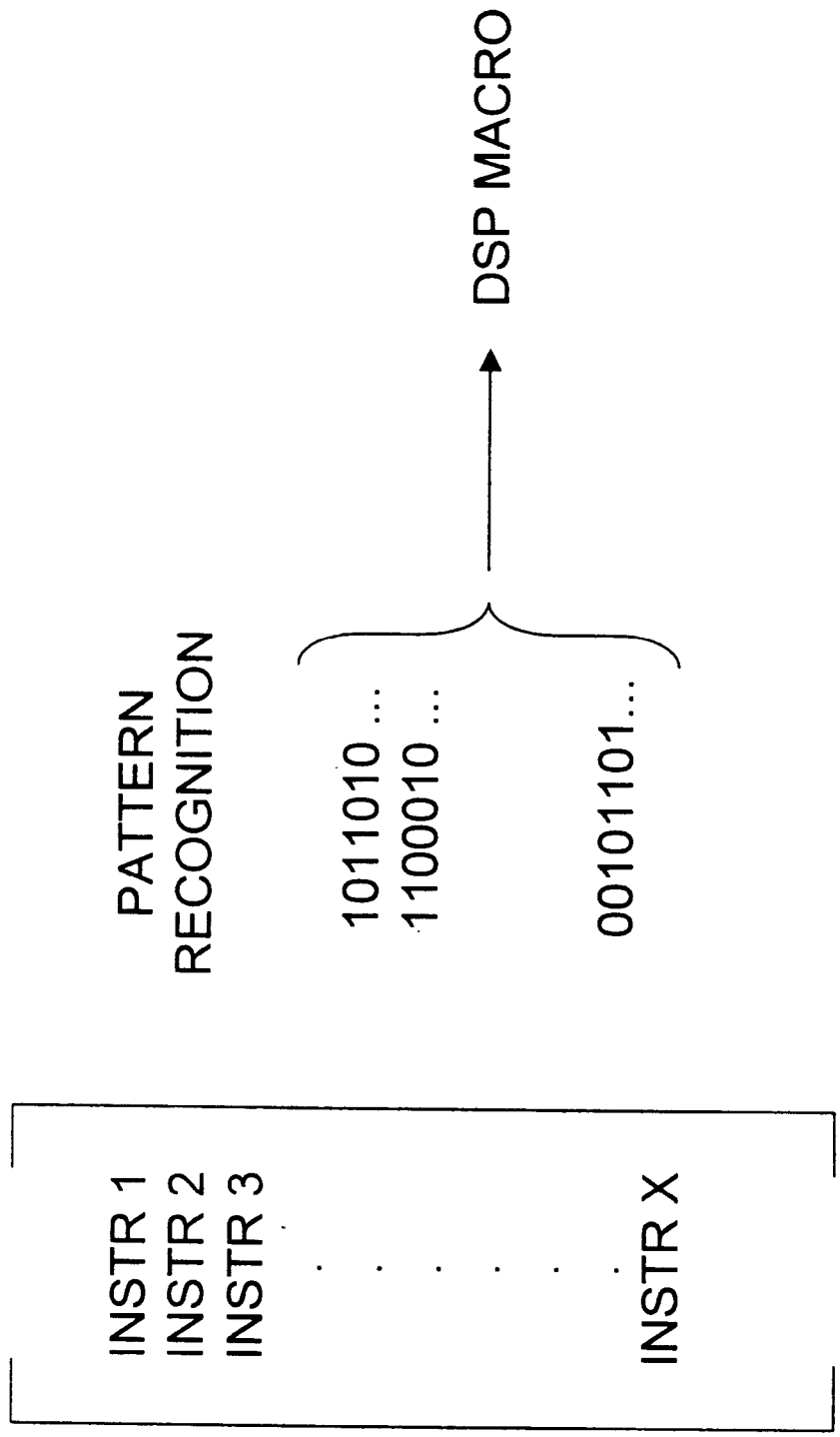
FIG. 7 illustrates operation of the pattern recognition detector of FIG. 6.

For instruction sequences where the processor mode bit is set to indicate that the sequence implements a DSP function, the pattern recognition detector 512 compares each of the patterns with the respective instruction sequence. The pattern recognition detector 512 examines the sequence of instructions stored in the instruction memory 202 and compares the sequence of instructions with the plurality of stored patterns. Operation of the pattern recognition detector 512 is shown in FIG. 7. The pattern recognition detector 512 may include a look-up table as the unit which performs the pattern comparisons, as desired. The pattern recognition detector 512 may also perform macro prediction on instruction sequences to improve performance.

The pattern recognition detector 512 determines whether the sequence of instructions in the instruction memory 202 substantially matches one of the plurality of stored patterns. A substantial match indicates that the sequence of instructions implements the respective digital signal processing function. In the preferred embodiment, a substantial match occurs where the instruction sequence matches a stored pattern by greater than 90%. Other matching thresholds, such as 95%, or 100%, may be used, as desired. The pattern recognition detector 512 determines the type of DSP function pattern which matched the sequence of instructions and passes this DSP function type to the conversion/mapping circuit 506.

Figure 8:
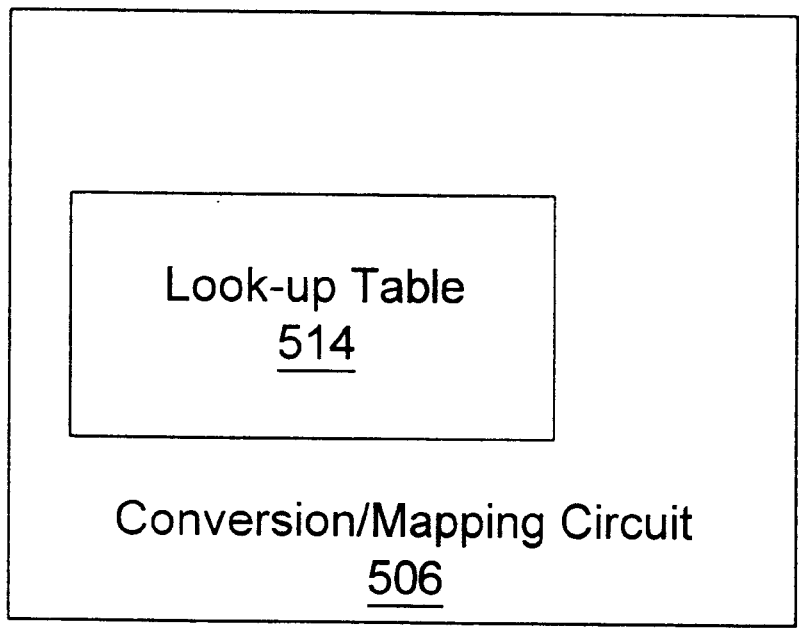
FIG. 8 is a block diagram of the function preprocessor including a look-up table according to one embodiment of the invention.

FIG. 8—Look-up Table

Referring now to FIG. 8, in another embodiment the conversion/mapping circuit 506 includes a look-up table (LUT) 514 which determines the digital signal processing function that corresponds to a sequence of instructions in the instruction memory 202. In this embodiment, the look-up table 514 may be in addition to, or instead of, the pattern recognition detector 512. Thus the LUT 514 is used in converting the sequence of instructions into a DSP function identifier and zero or more parameters. The LUT operates as shown in FIG. 9.

In an embodiment where the function preprocessor 204 includes only the look-up table 514, the look-up table 514 stores a plurality of patterns wherein each of the patterns is at least a subset of an instruction sequence which implements a digital signal processing function. Thus, this embodiment is similar to the embodiment of FIG. 6 described above, except that the function preprocessor 204 includes the look-up table 514 instead of the pattern recognition detector 512 for determining which DSP function corresponds to an instruction sequence. In this embodiment, the look-up table 514 requires an exact match with a corresponding sequence of instructions. If an exact match does not occur, then the sequence of instructions are passed to the one or more general purpose execution units, i.e., the general purpose CPU core, for execution.

Figure 9:
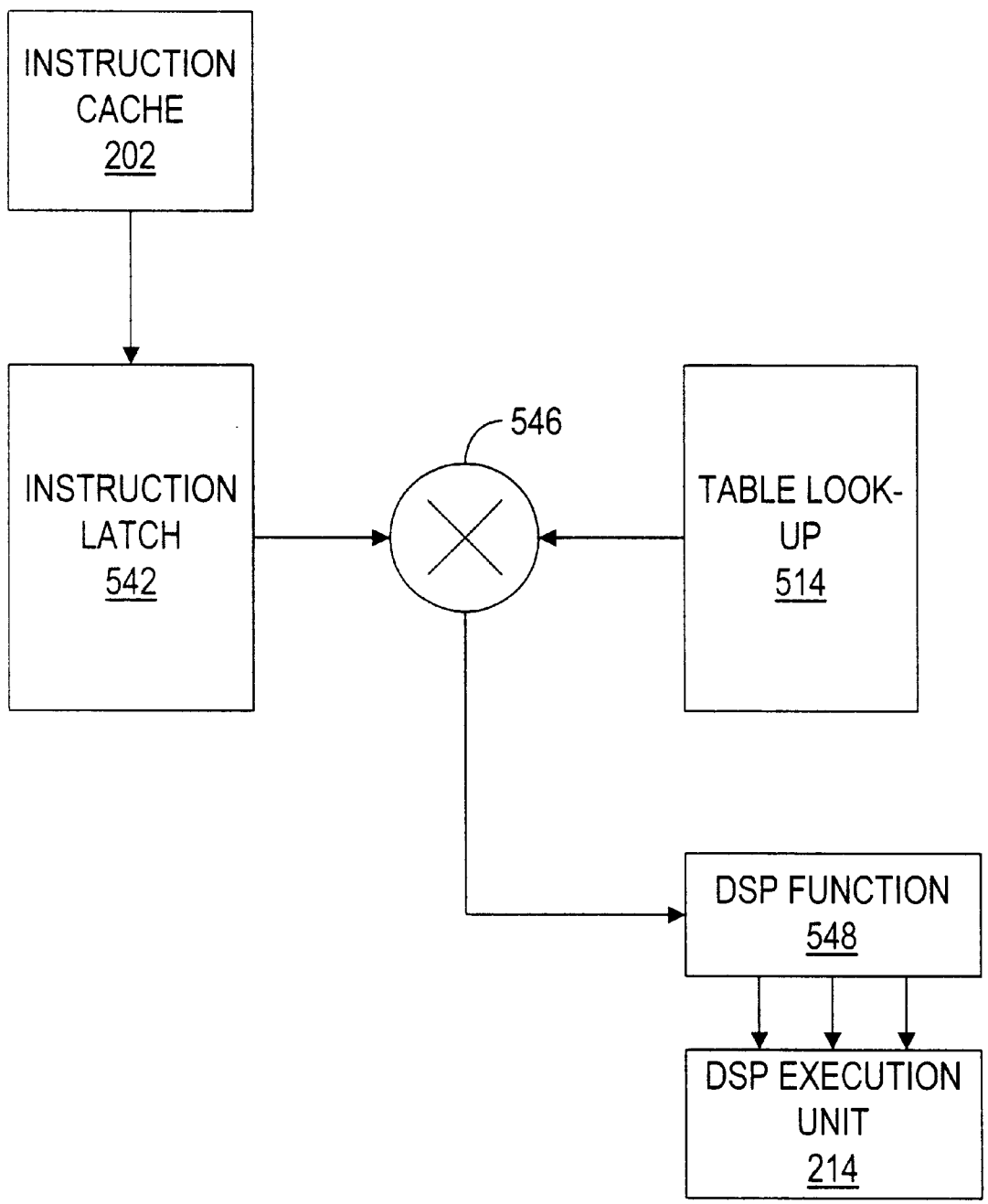
FIG. 9 illustrates operation of the look-up table of FIG. 8.

FIG. 9 illustrates operation of the look-up table 514 in this embodiment. As shown, a sequence of instructions in the instruction cache 202 are temporarily stored in the instruction latch 542. If the processor mode bit indicates that the instruction sequence implements a DSP function, then the contents of the instruction latch 542 are then compared with each of the entries in the look-up table 514 by element 546. If the contents of the instruction latch 542 exactly match one of the entries in the look-up table 514, then the DSP function or instruction 548 which corresponds to this entry is provided to the DSP execution unit 214.

In the above embodiments of FIGS. 6 and 8, the pattern recognition detector 512 and/or the look-up table 514 are configured to determine the DSP function which corresponds to an instruction sequence only when the determination can be made with relative certainty. This is because a "missed" instruction sequence, i.e., an instruction sequence which implements a DSP function, wherein the type of DSP instruction could not be positively identified, will not affect operation of the CPU 102, since the general purpose core or execution units can execute the instruction sequence. However, an instruction sequence which does implements a DSP function that is mis-identified, i.e., the wrong DSP function is determined to be implemented, is more problematic, and could result in possible erroneous operation. Thus it is anticipated that the pattern recognition detector 512 or the look-up table 514 may not accurately detect every instruction sequence which implements a DSP function. In this instance, even though the processor mode bit was set to indicate that the instruction sequence implemented a DSP function, the instruction sequence is preferably passed on to one of the general purpose execution units, as occurs in the prior art.

Figure 10:
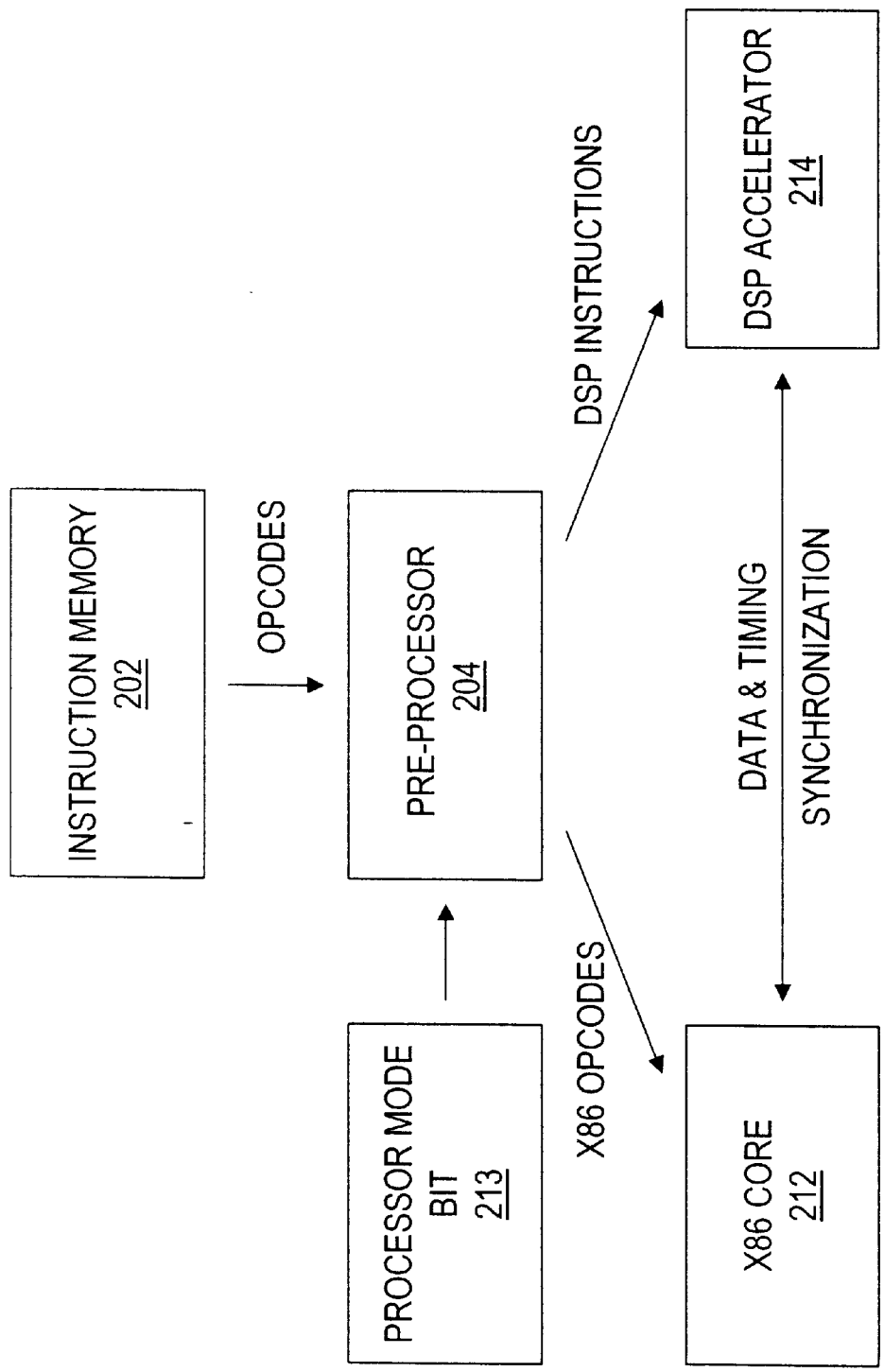
FIG. 10 is a block diagram diagram of the CPU according to the second emobdiment.

FIG. 10—Second Embodiment

FIG. 10 is a high level block diagram of the CPU 102 according to the second embodiment of the invention. Thus, FIG. 10 is similar to FIG. 2, but illustrates the second embodiment described above.

As shown, the CPU 102 includes an instruction cache or instruction memory 202 which receives instructions or opcodes from the system memory 110. In this second embodiment, the instructions comprise sequences of x86 or APX instructions and sequences of DSP instructions. Thus, unlike the first embodiment of FIG. 2 wherein all received instructions were APX instructions, in this second embodiment the received instructions comprises APX instruction sequences and DSP instruction sequences.

Preprocessor 204A is coupled to the instruction memory 202 and examines instruction sequences or opcode sequences in the instruction memory 202. The preprocessor 204A is also coupled to the X86 core 212 and the DSP core 214. The function preprocessor 204A is further coupled to the processor mode register 213 storing the processor mode bit. As shown, the preprocessor 204A examines the processor mode bit and selectively provides APX instructions or opcodes to the X86 core 212 or selectively provides DSP op-codes or instructions to the DSP core 214.

The X86 core 212 and DSP core 214 are coupled together and provide data and timing signals between each other. In one embodiment, the CPU 102 includes one or more buffers (not shown) which interface between the X86 core 212 and the DSP core 214 to facilitate transmission of data between the X86 core 212 and the DSP core 214.

In this second embodiment, the CPU 212 receives instructions which comprise sequences of general purpose, e.g., APX instructions, and which also comprises sequences of DSP instructions. The respective processor mode bit is set to indicate the beginning of a sequence of DSP instructions, and the processor mode bit is cleared to indicate the beginning of a sequence of APX instructions. The preprocessor 204A thus routes the instructions to the APX core or the DSP core based on the status of the processor mode bit. In this embodiment, the pre-processor 204A is not required to map APX instructions into DSP macros, but rather simply routes APX instructions to the x 86 core 212 and routes DSP instructions to the DSP core 214 based on the status of the processor mode bit.

Figure 11:
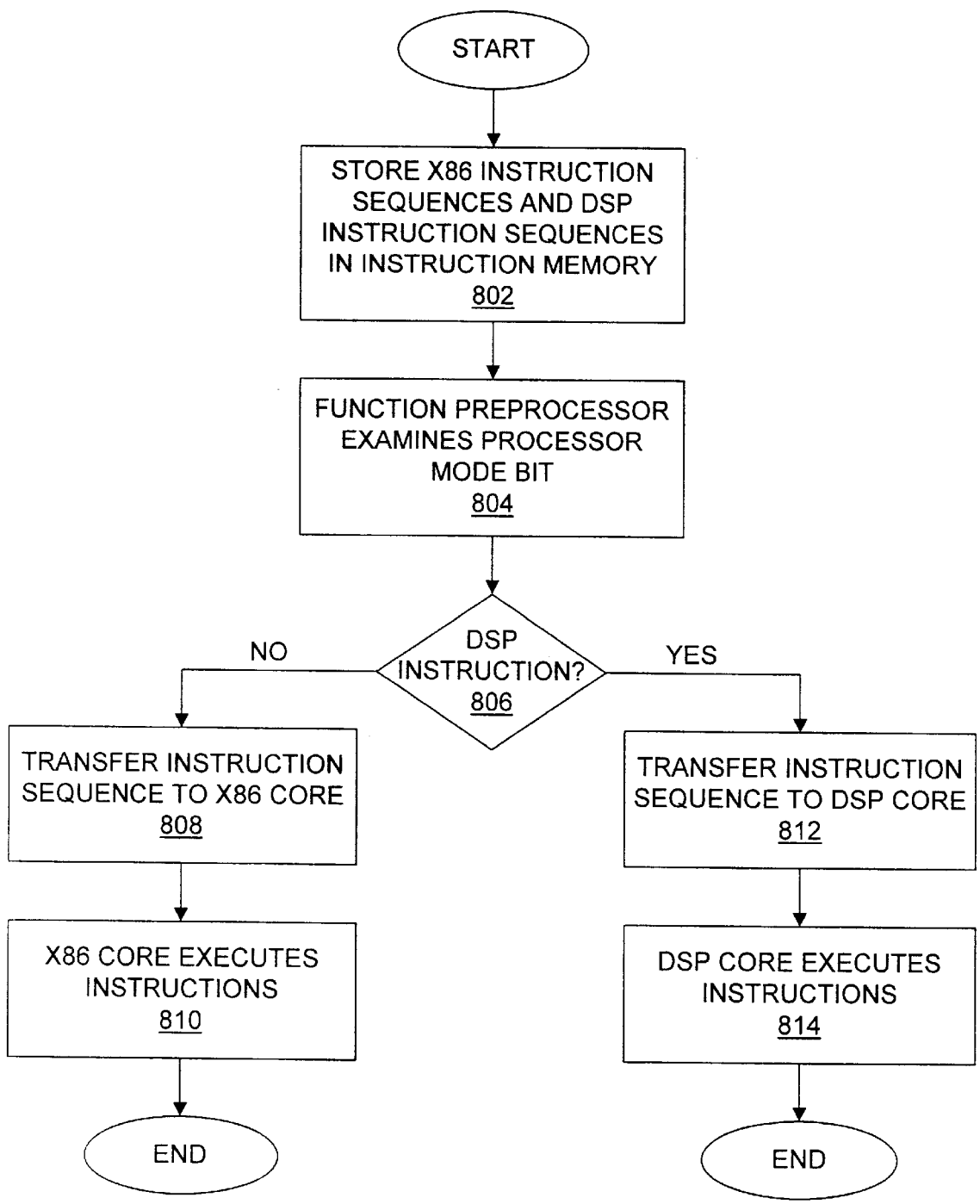
FIG. 11 is a flowchart diagram illustrating a second embodiment of the present invention.

FIG. 11—Flowchart Diagram: Second Embodiment

FIG. 11 is a flowchart diagram illustrating the second embodiment. As described above, in this second embodiment the CPU 102 receives an instruction sequence which comprises sequences of general purpose, e.g., APX instructions, and which also comprises sequences of DSP instructions. The respective processor mode bit is set to indicate the beginning of a sequence of DSP instructions, and the processor mode bit is cleared to indicate the beginning of a sequence of APX instructions. The CPU 102 thus routes the instructions to the APX core or the DSP core based on the status of the processor mode bit.

As shown, in step 802 the CPU 102 receives sequences of instructions. As noted above, these instructions comprise sequences of general purpose, e.g., APX instructions, and also comprise sequences of DSP instructions. In step 804 the preprocessor 204 examines the processor mode bit to determine if a respective sequence is a sequence of APX instructions or a sequence of DSP instructions.

In step 806 the preprocessor 204A determines, based on the status of the processor mode bit, if the respective sequence is a sequence of APX instructions or a sequence of DSP instructions. If the processor mode bit is cleared to indicate that the instructions or opcodes stored in the instruction cache 202 are not DSP instructions, the instructions are provided to the X86 core 212 in step 808. Thus, these instructions or opcodes are provided directly from the instruction cache 202 to the X86 core 212 for execution, as occurs in prior art X86 compatible CPUs. After the opcodes are transferred to the X86 core 212, in step 810 the X86 core 212 executes the instructions.

If the processor mode bit is set to indicate that the sequence of instructions comprise DSP instructions in step 806, then in step 812 the preprocessor 204A provides the DSP instruction sequence to the DSP core 214. In step 314 the DSP core 214 executes the DSP instructions.

Figure 12:
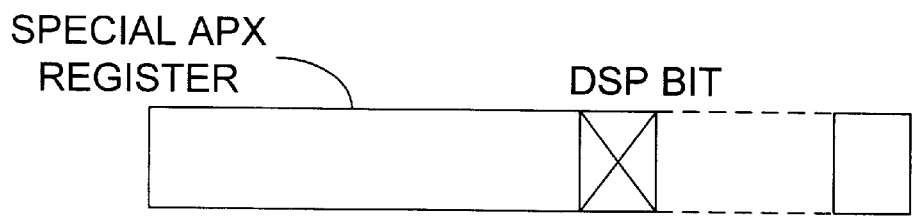
FIG. 12 illustrates one embodiment of the processor mode register.

FIG. 12—Processor Mode Register

FIG. 12 illustrates one embodiment of the processor mode register 213. As shown, in one embodiment, a special register in the APX CPU includes one or more bits, referred to as processor mode bits, assigned to indicate the processor mode, i.e., which indicate whether an instruction sequence comprises DSP instructions or implements a DSP function, or whether the instruction sequence is a regular APX instruction sequence.

Figure 13:
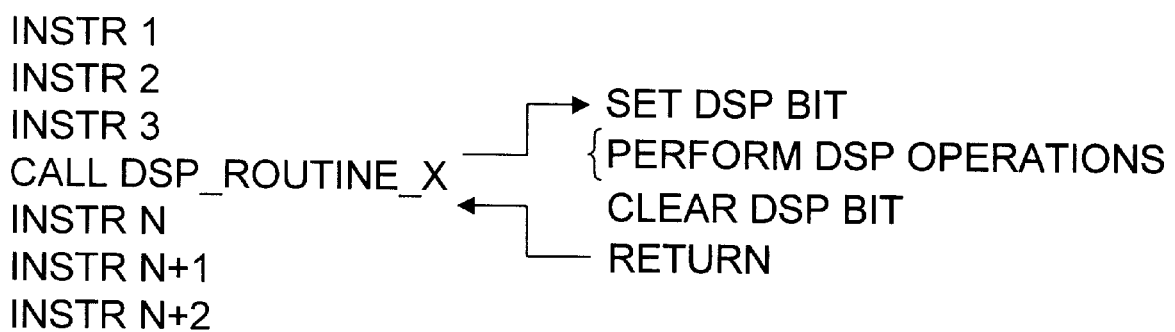
FIG. 13 illustrates one embodiment of an instruction sequence which includes a DSP instruction sequence.

FIG. 13—Instruction Sequence

FIG. 13 illustrates one embodiment of an instruction sequence which includes a DSP instruction sequence. As shown, after a number of APX instructions, e.g. three instructions, a DSP routine is called. The DSP routine sets the DSP bit to indicate the start of a sequence of DSP instructions. After the DSP instructions or operations are executed by the DSP core 214, the routine clears the DSP bit and returns to execution of APX instructions.

Conclusion

Therefore, the present invention comprises a novel CPU or microprocessor architecture which optimizes execution of DSP and/or mathematical operations while maintaining backwards compatibility with existing software.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A central processing unit which performs general purpose processing functions and digital signal processing (DSP) functions, comprising:

an instruction memory for storing a plurality of instructions, wherein said instruction memory stores one or more sequences of instructions which are intended to perform a DSP function;

a processor mode memory for storing one or more processor mode bits, wherein said one or more processor mode bits indicate whether a sequence of instructions implements a DSP function;

a function preprocessor coupled to the instruction memory and coupled to the processor mode memory, wherein the function preprocessor is operable to examine said one or more processor mode bits in said processor mode memory to determine whether a sequence of said instructions in said instruction memory is intended to perform a digital signal processing function, wherein the function preprocessor is operable to convert said sequence of said instructions in said instruction memory into a DSP function identifier if said one or more processor mode bits in said processor mode memory indicate that said sequence of said instructions in said instruction memory is intended to perform a DSP function;

at least one general purpose processing core coupled to the function preprocessor for executing instructions in said instruction memory, wherein the function preprocessor provides a sequence of instructions to said at least one general purpose processing core if said one or more processor mode bits indicate that said sequence of said instructions in said instruction memory is not intended to perform a DSP function;

at least one digital signal processing core coupled to the function preprocessor for performing digital signal processing functions, wherein the function preprocessor is operable to provide said digital signal processing function identifier to said at least one digital signal processing core, wherein the at least one digital signal processing core receives said digital signal processing function identifier and performs a digital signal processing function in response to said received digital signal processing function identifier from said function preprocessor.

2. The central processing unit of claim 1, wherein said instruction memory stores a first sequence of instructions which does not perform a digital signal processing function, and wherein said instruction memory stores a second sequence of instructions which performs a digital signal processing function;

wherein said at least one general purpose processing core executes said first sequence of instructions;

wherein said at least one digital signal processing core performs said digital signal processing function in response to said received digital signal processing function identifier, wherein said digital signal processing function performed by said digital signal processing core is substantially equivalent to execution of said second sequence of instructions.

3. The central processing unit of claim 1, wherein said processor mode memory stores a respective value for said one or more processor mode bits for each respective sequence of instructions in said instruction memory;

wherein said respective value indicates whether said respective sequence of instructions implements a DSP function.

4. The central processing unit of claim 1, wherein said processor mode memory stores a value indicating a type of DSP function implemented by a sequence of instructions;

wherein said processor mode memory stores said value indicating said type of DSP function implemented by said sequence of instructions when said one or more processor mode bits indicate that said sequence of instructions implements a DSP function;

wherein said function preprocessor uses said value indicating said type of DSP function implemented by said sequence of instructions in converting said sequence of said instructions in said instruction memory into a DSP function identifier.

5. The central processing unit of claim 1, wherein said at least one digital signal processing core provides data and timing signals to said at least one general purpose processing core.

6. The central processing unit of claim 1, wherein said function preprocessor generates a digital signal processing function identifier and one or more parameters in response to said one or more processor mode bits indicating that said sequence of instructions in said instruction memory is intended to perform a digital signal processing function.

7. The central processing unit of claim 1, wherein said at least one general purpose processing core is compatible with the X86 family of microprocessors.

8. The central processing unit of claim 7, wherein said plurality of instructions are X86 opcodes.

9. The central processing unit of claim 1, wherein said at least one digital signal processing core is adapted for performing one or more mathematical operations from the group consisting of convolution, correlation, Fast Fourier Transforms, and inner product.

10. The central processing unit of claim 1, wherein said at least one general purpose processing core and said at least one digital signal processing core operate substantially in parallel.

11. A method for executing instructions in a central processing unit (CPU), wherein the CPU includes at least one general purpose CPU core and at least one digital signal processing (DSP) core, the method comprising:

storing one or more sequences of instructions in an instruction memory for execution by the central processing unit;

storing one or more processor mode bits in a processor mode memory, wherein said one or more processor mode bits indicate whether a sequence of instructions implements a DSP function;

examining a sequence of instructions in said instruction memory;

examining said one or more processor mode bits to determine whether said sequence of instructions in said instruction memory is intended to perform a DSP function;

converting said sequence of instructions in said instruction memory into a DSP function identifier if said one or more processor mode bits indicate that said sequence of instructions in said instruction memory is intended to perform a DSP function;

the digital signal processing core receiving said DSP function identifier;

the digital signal processing core performing a digital signal processing function in response to said received digital signal processing function identifier.

12. The method of claim 11, further comprising:

said general purpose central processing unit core executing said sequence of instructions if said one or more processor mode bits indicate that said sequence of instructions in said instruction memory is not intended to perform a DSP function.

13. The method of claim 12, further comprising:

wherein said storing comprises storing a first sequence of instructions in said instruction memory which performs a first digital signal processing function;

wherein said storing comprises storing a second sequence of instructions in said instruction memory which does not perform a digital signal processing function;

wherein said converting converts said first sequence of instructions in said instruction memory which is intended to perform said first digital signal processing function into a first digital signal processing function identifier;

wherein said performing comprises said digital signal processing core performing said first digital signal processing function in response to said first digital signal processing function identifier, wherein said performing said first digital signal processing function is substantially equivalent to execution of said first sequence of instructions; and said general purpose central processing unit core executing said second sequence of instructions.

14. The method of claim 11, wherein said storing one or more processor mode bits in the processor mode memory comprises storing a respective value for said one or more processor mode bits for each respective sequence of instructions in said instruction memory;

wherein said respective value indicates whether said respective sequence of instructions implements a DSP function.

15. The method of claim 11, further comprising:

storing a value in said processor mode memory indicating a type of DSP function implemented by a sequence of instructions;

wherein said processor mode memory stores said value indicating said type of DSP function implemented by said sequence of instructions when said one or more processor mode bits indicate that said sequence of instructions implements a DSP function;

wherein said function preprocessor uses said value indicating said type of DSP function implemented by said sequence of instructions in converting said sequence of said instructions in said instruction memory into a DSP function identifier.

16. The method of claim 11, further comprising:

said digital signal processing core and said general purpose central processing unit core operating substantially in parallel.

17. The method of claim 11, further comprising:

said digital signal processing core providing data and timing signals to said general purpose central processing unit core.

18. The method of claim 11, further comprising:

said function preprocessor generating a digital signal processing function identifier and one or more parameters in response to said determining that said sequence of instructions in said instruction memory is intended to perform a digital signal processing function.

19. The method of claim 9, wherein said general purpose central processing unit core is compatible with the X86 family of microprocessors;

wherein said one or more sequences of instructions comprise X86 opcodes.

20. The method of claim 11, wherein said digital signal processing core performs one or more mathematical operations from the group consisting of convolution, correlation, Fast Fourier Transform, and inner product.

* * * * *